United States Patent

Konishi et al.

[11] Patent Number: 5,752,575
[45] Date of Patent: May 19, 1998

[54] TORQUE DISTRIBUTION CONTROL SYSTEM IN VEHICLE

[75] Inventors: Yoshikazu Konishi; Tetsurou Hamada; Yoshihiro Kanamaru, all of Saitama, Japan

[73] Assignee: Honda Giken Kogyo Kabushiki Kaisha, Tokyo, Japan

[21] Appl. No.: 544,127

[22] Filed: Oct. 17, 1995

[30] Foreign Application Priority Data

Oct. 27, 1994 [JP] Japan .................. 6-263343

[51] Int. Cl.$^6$ .................. B60K 23/04
[52] U.S. Cl. .................. 180/76; 364/424.05
[58] Field of Search .................. 180/76, 197, 6.2, 180/6.24, 6.26, 248, 249; 364/424.01, 424.05, 424.1

[56] References Cited

U.S. PATENT DOCUMENTS

| | | | |
|---|---|---|---|
| 5,058,700 | 10/1991 | Shibahata | 180/245 |
| 5,279,384 | 1/1994 | Shibahata | 180/248 |
| 5,417,298 | 5/1995 | Shibahata | 180/76 |

FOREIGN PATENT DOCUMENTS

| | | |
|---|---|---|
| 3908152 | 10/1989 | Germany . |
| 3912349 | 11/1989 | Germany . |
| 4340735 | 6/1994 | Germany .................. 180/76 |
| 61-94427 | 6/1986 | Japan . |
| 5131855 | 5/1993 | Japan . |
| 6-115370 | 4/1994 | Japan . |
| 6-115371 | 4/1994 | Japan . |
| 6-115372 | 4/1994 | Japan . |
| 6-115373 | 4/1994 | Japan . |

*Primary Examiner*—Kevin Hurley
*Attorney, Agent, or Firm*—Weiner, Carrier, Burt & Esser, P.C.; Joseph P. Carrier; Irving M. Weiner

[57] ABSTRACT

A gearbox and two hydraulic clutches are disposed between left and right follower wheels of a vehicle. The torque transfer capacity of the hydraulic clutches is controlled to effect the distribution of a torque between the follower wheels. In a low lateral acceleration range, the torque transfer capacity is increased in accordance with an increase in lateral acceleration to enhance the turning performance and the high-speed stability performance. In a high lateral acceleration range, the torque transfer capacity is decreased in accordance with an increase in lateral acceleration, such that it does not exceed a largest frictional force of a wheel acting as an inner wheel during turning movement of the vehicle, thereby insuring a cornering force.

16 Claims, 3 Drawing Sheets

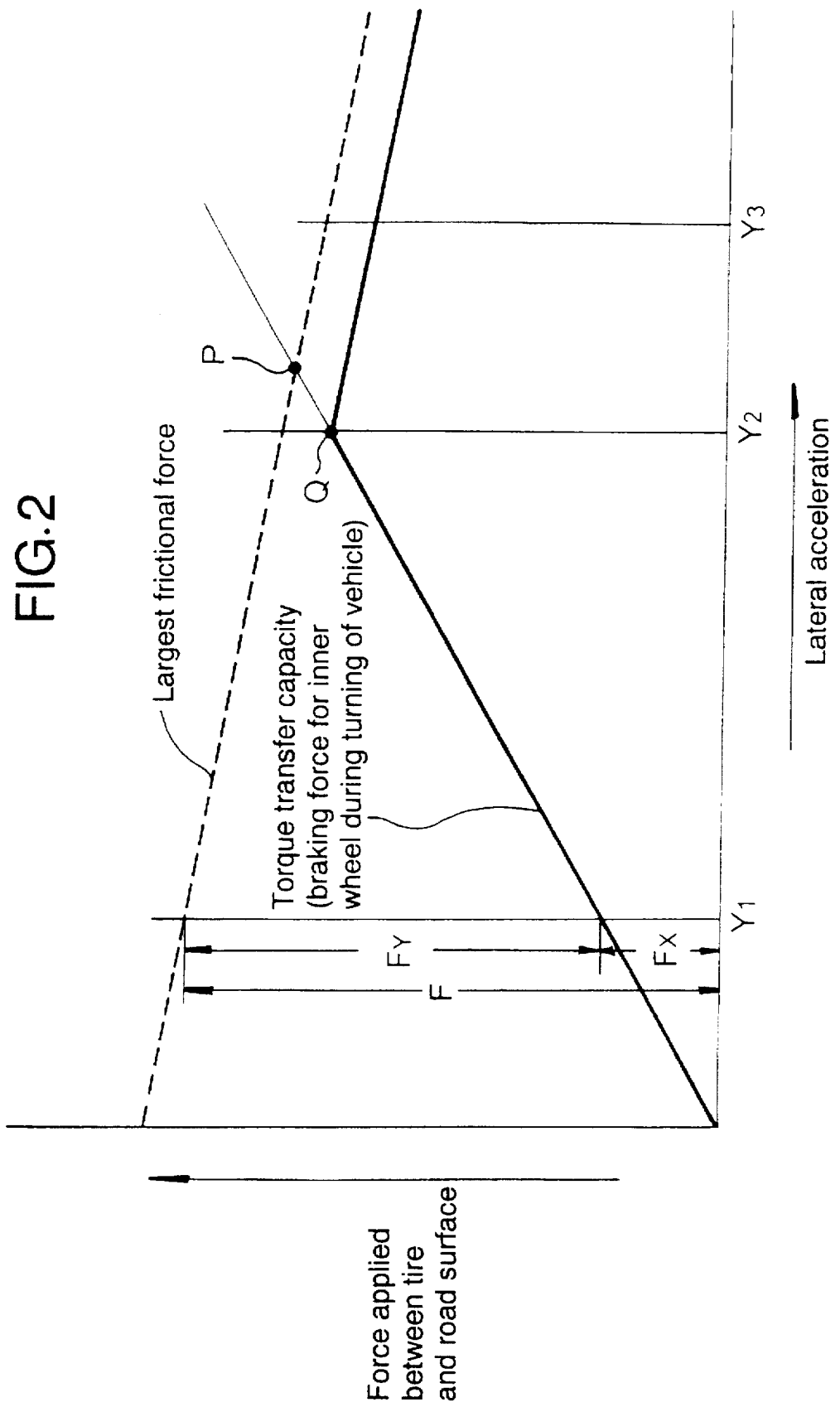

TORQUE DISTRIBUTION CONTROL SYSTEM IN VEHICLE

BACKGROUND OF THE INVENTION

1. Field of the Invention

The present invention relates to a torque distribution control system in a vehicle, including a change gearbox and a torque transmitting clutch which connect left and right non-main driving wheels of the vehicle to each other to generate a braking force to one of the left and right non-main driving wheels and to generate a driving force to the other of the left and right non-main driving wheels, and a control means for controlling the torque transfer capacity of the torque transmitting clutch based on at least a lateral acceleration of the vehicle.

2. Description of the Relevant Art

Such a torque distribution control system in a vehicle is known from Japanese Patent Application Laid-open No. 131855/93.

In the known torque distribution control system, the driving force can be generated to a wheel acting as an outer wheel during a turning movement of the vehicle, and the braking force can be generated to a wheel acting as an outer wheel by transmitting a torque from the inner wheel to the outer wheel. In addition, the driving force can be generated to the outer wheel and the braking force can be generated to the inner wheel by transmitting a torque from the outer wheel to the inner wheel, thereby enhancing the high speed stability performance.

In such torque distribution control system, the magnitudes of the driving force and the braking force (namely, the magnitude of the torque transfer capacity of the torque transmitting clutch mounted between the left and right wheels) can be controlled such that it is proportional to the magnitude of the lateral acceleration of the vehicle. In other words, during a quick turning of the vehicle with a large acceleration, a large driving force and a large braking force are generated, and during a slow turning of the vehicle with a small acceleration, a small driving force and a small braking force are generated.

When the vehicle is turned, a vehicle body is intended to move down outwardly in a turning direction. For this reason, a grounding load of the inner wheel is decreased in accordance with an increase in lateral acceleration, and the largest frictional force between a tire and a road surface (i.e., a radius of a circle of friction of the tire) is also decreased. On the other hand, the driving force or the braking force for the inner wheel is controlled such that it is increased in accordance with an increase in lateral acceleration, as described above. For this reason, when the lateral acceleration becomes a predetermined value or more, a following problem is encountered: the driving force or the braking force for the inner wheel exceeds the largest frictional force between the tire and the road surface and hence, the inner wheel cannot generate a sufficient cornering force. If the driving force or the braking force for the inner wheel is set at a smallish value in order to avoid such a disadvantage, it is impossible to sufficiently exhibit the desired turning performance and the desired high-speed stability performance in a low lateral acceleration range.

SUMMARY OF THE INVENTION

Accordingly, it is an object of the present invention to provide a torque distribution control system in a vehicle, wherein an effect provided by a distribution of a torque between left and right wheels can be sufficiently exhibited in a low lateral acceleration range, and a cornering force can be insured in a high lateral acceleration range.

To achieve the above object, according to the present invention, there is provided a torque distribution control system to a vehicle, comprising a change gearbox and a torque transmitting clutch which connect left and right non-main driving wheels of the vehicle to each other to generate a braking force to one of the left and right non-main driving wheels and to generate a driving force to the other of the left and right non-main driving wheels, and a control means for controlling the torque transfer capacity of the torque transmitting clutch based on at least a lateral acceleration of the vehicle, wherein the control means increases the torque transfer capacity in accordance with an increase in lateral acceleration, when the lateral acceleration is lower than a predetermined value, and the control means decreases the torque transfer capacity in accordance with an increase in lateral acceleration, when the lateral acceleration is equal to or higher than the predetermined value.

With the above features of the present invention, in a low lateral acceleration range in which the lateral acceleration is lower than the predetermined value, the torque transfer capacity of the torque transmitting clutch is increased in accordance with an increase in lateral acceleration, and hence, the braking force or the driving force for a wheel acting as an inner wheel during turning of the vehicle is increased to insure a turning performance and a high-speed stability performance. In a high lateral acceleration range in which the lateral acceleration is equal to or higher than the predetermined value, the torque transfer capacity of the torque transmitting clutch is decreased in accordance with an increase in lateral acceleration, and hence, the braking force or the driving force for the inner wheel is decreased to insure a cornering force.

The above and other objects, features and advantages of the invention will become apparent from the following description of a preferred embodiment taken in conjunction with the accompanying drawings.

BRIEF DESCRIPTION OF THE DRAWINGS

FIG. 2 is a graph illustrating the relationship between the force applied between a tire and a road surface an the lateral acceleration.

DESCRIPTION OF THE PREFERRED EMBODIMENT

The present invention will now be described by way of a preferred embodiment with reference to the accompanying drawings.

Figure 1:
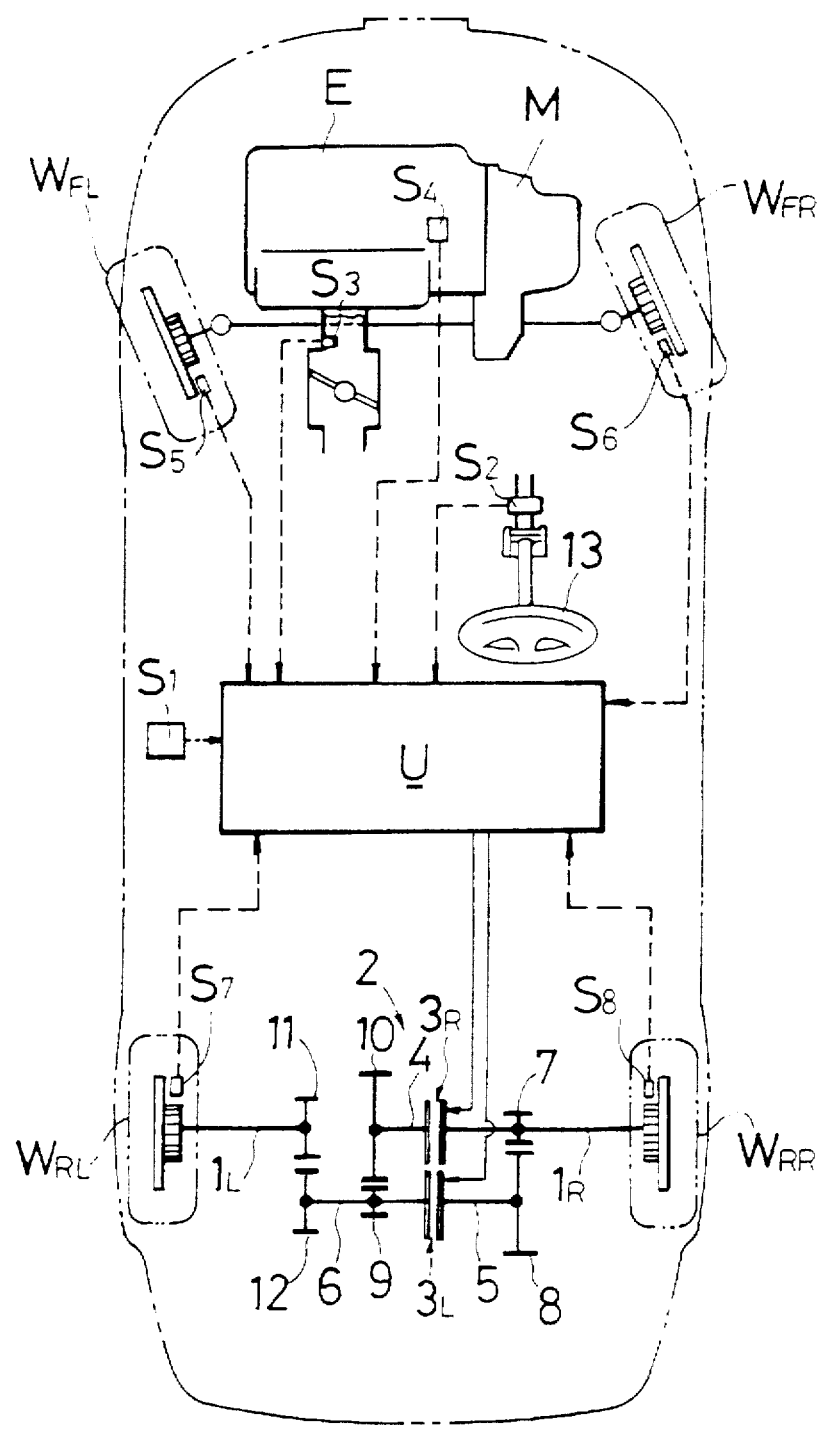
FIG. 1 is a schematic illustration of the entire arrangement of a front engine and front drive vehicle including a torque distribution control system according to an embodiment of the present invention.

Referring to FIG. 1, a transmission M is connected to a right end of an engine E which is mounted horizontally at a front portion of the vehicle body. A left front wheel $W_{FL}$ and a right front wheel $W_{FR}$, which are driving wheels, are driven by the engine E and the transmission M.

A change gearbox 2 is mounted between axles $1_L$ and $1_R$ of left and right rear wheels $W_{RL}$ and $W_{RR}$ as follower wheels, and connects the left and right rear wheels $W_{RL}$ and $W_{RR}$, such that they are rotated at different rotational speeds. A first hydraulic clutch $3_L$ and a second hydraulic clutch $3_R$ are mounted in the change gearbox 2. When the first hydraulic clutch $3_L$ is brought into its engaged state, the rotational speed of the left rear wheel $W_{RL}$ is decreased, and the rotational speed of the right rear wheel $W_{RR}$ is increased. When the second hydraulic clutch $3_R$ is brought into its engaged state, the rotational speed of the right rear wheel $W_{RR}$ is decreased, and the rotational speed of the left rear wheel $W_{RL}$ is increased.

More specifically, the change gearbox 2 includes a first shaft 4 disposed coaxially with the left and right axles $1_L$ and $1_R$, and second and third shafts 5 and 6 which are parallel to the left and right axles $1_L$ and $1_R$ and disposed coaxially with each other. The first hydraulic clutch $3_L$ is disposed between the second and third shafts 5 and 6, and the second hydraulic clutch $3_R$ is disposed between the right axle $1_R$ and the first shaft 4. A first gear 7 of a smaller diameter provided on the right axle $1_R$ is meshed with a second gear 8 of a larger diameter provided on the second shaft 5, and a third gear 9 of a smaller diameter provided on the third shaft 6 is meshed with a fourth gear 10 of a larger diameter provided on the first shaft 4. A fifth gear 11 provided on the left axle $1_L$ is meshed with a sixth gear 12 provided on the third shaft 6.

The first and third gears 7 and 9 have the same number of teeth, and the second and fourth gears 8 and 10 have the same number of teeth which is set larger than the number of teeth of the first and third gears 7 and 9. The fifth and sixth gears 11 and 12 have the same number of teeth.

Therefore, when the first hydraulic clutch $3_L$ is brought into its engaged state, the right rear wheel $W_{RR}$ is connected to the left rear wheel $W_{RL}$ through the right axle $1_R$, the first gear 7, the second gear 8, the second shaft 5, the first hydraulic clutch $3_L$, the third shaft 6, the sixth gear 12, the fifth gear 11 and the left axle $1_L$. At that time, the rotational speed of the left rear wheel $W_{RL}$ is decreased relative to the rotational speed of the right rear wheel $W_{RR}$ in accordance with a ratio of the number of teeth of the first gear 7 to the number of teeth of the second gear 8. Specifically, when the first hydraulic clutch $3_L$ is brought into its engaged state from a condition in which the left and right rear wheels $W_{RL}$ and $W_{RR}$ are rotated at the same speed, the rotational speed of the right rear wheel $W_{RR}$ is increased, and the rotational speed of the left rear wheel $W_{RL}$ is decreased.

When the second hydraulic clutch $3_R$ is brought into its engaged state, the right wheel $W_{RR}$ is connected to the left rear wheel $W_{RL}$ through the right axle $1_R$, the second hydraulic clutch $3_R$, the first shaft 4, the fourth gear 10, the third gear 9, the third axle 6, the sixth gear 12, the fifth gear 11 and the left axle $1_L$. At that time, the rotational speed of the left rear wheel $W_{RL}$ is increased relative to the rotational speed of the right rear wheel $W_{RR}$ in accordance with a ratio of the number of teeth of the fourth gear 10 to the number of teeth of the third gear 9. Specifically, when the second hydraulic clutch $3_R$ is brought into its engaged state from a condition in which the left and right rear wheels $W_{RL}$ and $W_{RR}$ are rotated at the same speed, the rotational speed of the right rear wheel $W_{RR}$ is decreased, and the rotational speed of the left rear wheel $W_{RL}$ is increased.

Engagement forces of the first and second hydraulic clutches $3_L$ and $3_R$ can be controlled continuously by adjusting the magnitude of the hydraulic pressure applied to these hydraulic clutches $3_L$ and $3_R$. Therefore, the ratio of the rotational speed of the left rear wheel $W_{RL}$ and the rotational speed of the right rear wheel $W_{RR}$ can also be controlled continuously within a range determined by a ratio of numbers of teeth of the first, second, third and fourth gears 7, 8, 9 and 10.

The following signals are inputted into an electronic control unit U to which the first and second hydraulic clutches $3_L$ and $3_R$ are connected: a signal from a lateral acceleration sensor $S_1$ for detecting a lateral acceleration of the vehicle body, a signal from a steering angle sensor $S_2$ for detecting a rotational angle of a steering wheel 13, a signal from an intake pipe internal absolute pressure sensor $S_3$ for detecting an internal absolute pressure in an intake pipe of the engine E, a signal from an engine revolution-number sensor $S_4$ for detecting a number of revolutions of the engine E, and signals from wheel speed sensors $S_5$ to $S_8$ for detecting numbers of revolutions of the four wheels respectively to calculate a vehicle speed.

The electronic control unit U corrects the lateral acceleration of the vehicle body detected by the lateral acceleration sensor $S_1$, based on a rotational angle of the steering wheel 13 detected by the steering angle sensor $S_2$ and wheel speeds detected by the wheel speed sensors $S_5$ to $S_8$, thereby calculating a lateral acceleration free from a time lag. The electronic control unit U also calculates an engine torque from outputs from the intake pipe internal absolute pressure sensor $S_3$ and the engine revolution-number sensor $S_4$ to evaluate a longitudinal acceleration of the vehicle.

Thus, the electronic control unit U controls the engagement forces of the first and second hydraulic clutches $3_L$ and $3_R$ based on the lateral and longitudinal accelerations.

The operation of the embodiment of the present invention having the above-described construction will be described below.

First, the maximum frictional force (grip force) between a tire of the vehicle which is being turned and a road surface will be described.

Provided that the frictional coefficient of the road surface is constant, the magnitude of the maximum frictional force between the tire and road surface is proportional to the grounding load of the tire. When the vehicle is traveling straight, the grounding loads of the left and right wheels are equal to each other. However, when the vehicle is turned, the grounding loads of the wheels acting as inner and outer wheels during turning movement of the vehicle are varied from each other. During turning movement of the vehicle, a centrifugal force directed outwardly in a turning direction is applied to the center of gravity of the vehicle and hence, the vehicle body tends to be moved down closer to the road surface outwardly in the turning direction. As a result, the wheel acting as an inner wheel during turning movement of the vehicle develops a tendency to be lifted from the road surface, whereby the grounding load of the inner wheel is decreased. On the other hand, the wheel acting as an outer wheel during turning movement of the vehicle develops a tendency to be urged against the road surface, whereby the grounding load of the outer wheel is increased.

FIG. 2 is a graph made by taking the lateral acceleration of the vehicle on the axis of abscissas and the force applied between the inner wheel during turning of the vehicle and the road surface on the axis of ordinates, wherein a dashed line shows a variation in maximum frictional force between the inner wheel during turning movement of the vehicle and the road surface relative to the lateral acceleration. As apparent from this graph, when the lateral acceleration of the vehicle is increased, the maximum frictional force between the inner wheel during turning of the vehicle and the road surface is decreased.

The maximum frictional force between the inner wheel and the road surface also depends upon the longitudinal acceleration and hence, is corrected in accordance with the longitudinal acceleration evaluated in the above-described manner. When the vehicle is being longitudinally accelerated, the dashed line showing the maximum frictional force between the inner one of the follower wheels, i.e., the rear wheels during turning of the vehicle, and the road surface is displaced upwardly in parallel. When the vehicle is being longitudinally decelerated, the dashed line is displaced downwardly in parallel. The rate of decrease in maximum frictional force attendant on an increase in lateral acceleration depends upon the characteristics of the vehicle and is determined theoretically or experimentally.

Now, when the vehicle is traveling at a lower or medium speed, a braking force is applied to the inner one of the left and right rear wheels $W_{RL}$, $W_{RR}$ during turning movement of the vehicle, while a driving force is applied to the outer one of the left and right rear wheels $WR_L$, $W_{RR}$ during such turning movement of the vehicle, in order to enhance the turning performance. For this purpose, during leftward turning movement of the vehicle, the rotational speed of the right rear wheel $W_{RR}$ (i.e., the outer wheel during turning movement of the vehicle) is increased and at the same time, the rotational speed of the left rear wheel $W_{RL}$ (i.e., the inner wheel during turning movement of the vehicle) is decreased by bringing the first hydraulic clutch $3_L$ into its engaged state. During rightward turning movement of the vehicle, the rotational speed of the right rear wheel $W_{RR}$ (i.e., the inner wheel during turning movement of the vehicle) is decreased and at the same time, the rotational speed of the left rear wheel $W_{RL}$ (i.e., the outer wheel during turning movement of the vehicle) is increased by bringing the second hydraulic clutch $3_R$ into its engaged stage.

When the speed of the outer wheel is increased, while the speed of the inner wheel is decreased in the above-described manner, a driving force is generated in the speed-increased outer wheel, while a braking force is generated in the speed-decreased inner wheel. The magnitudes of the driving force and the braking force become equal to a torque transfer capacity transmitted by the first or second hydraulic clutch $3_L$ or $3_R$ which has been brought into its engaged state.

The torque transfer capacity (i.e., the braking force of the inner wheel during turning of the vehicle) from the first or second hydraulic clutch $3_L$ or $3_R$ is controlled as shown by a solid line in FIG. 2 in accordance with the magnitude of the lateral acceleration. More specifically, the torque transfer capacity is controlled such that it is always smaller than the largest frictional force of the inner wheel during turning movement of the vehicle in such a manner that the torque transfer capacity is increased linearly from 0 (zero) in accordance with an increase in lateral acceleration, and the torque transfer capacity is decreased linearly in accordance with an increase in lateral acceleration from a Q point short of a P point at which the torque transfer capacity and the largest frictional force of the inner wheel during turning of the vehicle are equal to each other. As shown, the rate of decrease of the torque transfer capacity beyond the point Q is approximately the same as that of the largest frictional force of the inner wheel beyond such point according to a preferred aspect of the invention.

The characteristics of the torque transfer capacity is previously stored as a map in a memory within the electronic control unit U. During operation of the system, a predetermined map may be selected for use from a plurality of types of maps, based on a value of the longitudinal acceleration, or a map value in several types of maps may be used while being corrected based on the longitudinal acceleration. In addition, a friction coefficient of a road surface can be evaluated, and based on this friction coefficient, the map value can also be corrected.

An effect provided by controlling the torque transfer capacity as shown by the solid line in FIG. 2 will be described below with reference to FIGS. 2 and 3.

Figure 3A:
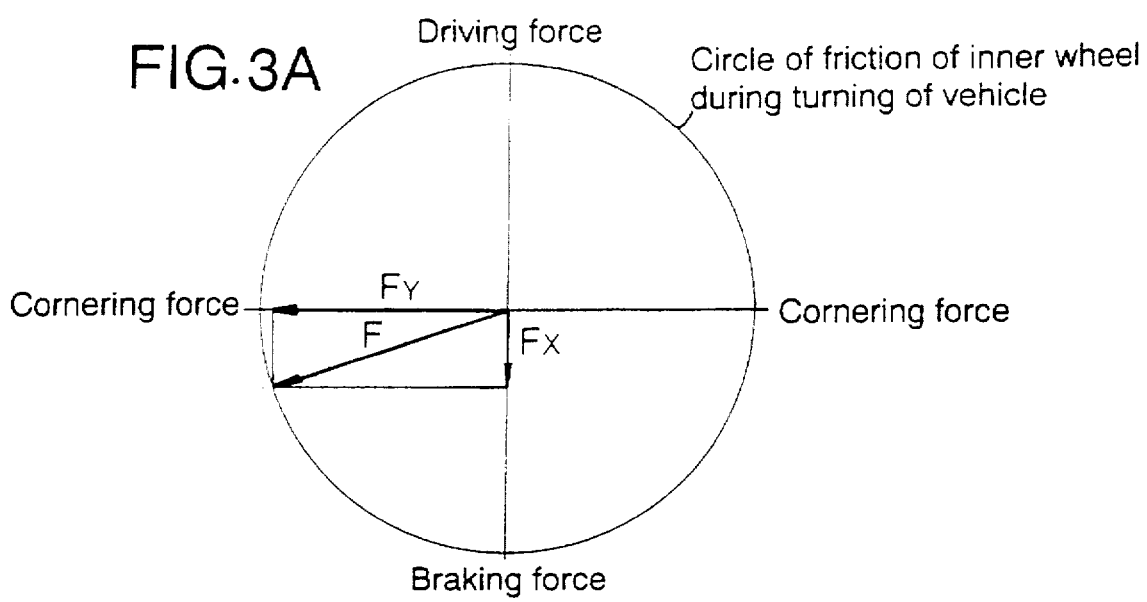
FIGS. 3A, 3B and 3C are diagrams showing circles of friction of a tire of a wheel acting as an inner wheel during turning movement of the vehicle.
Figure 3B:
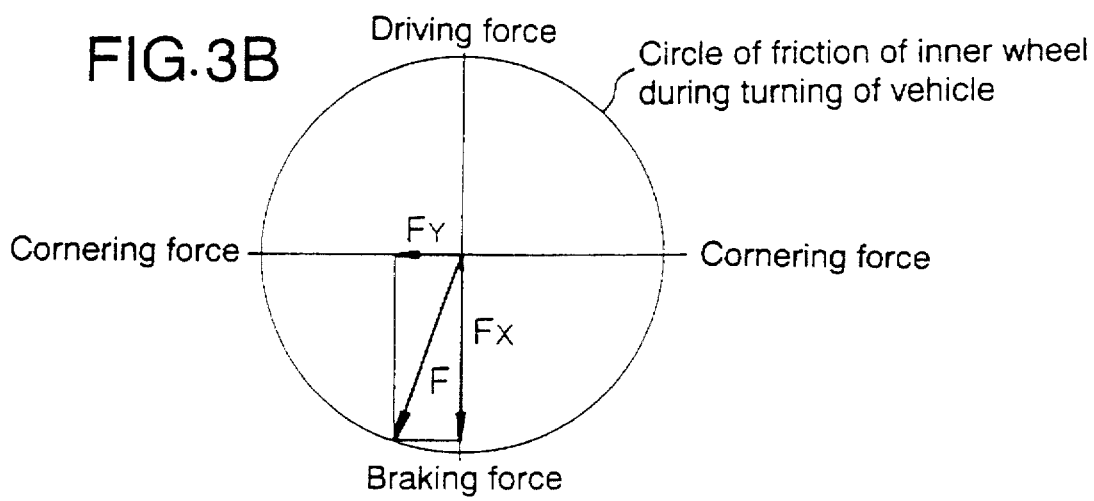
Figure 3C:
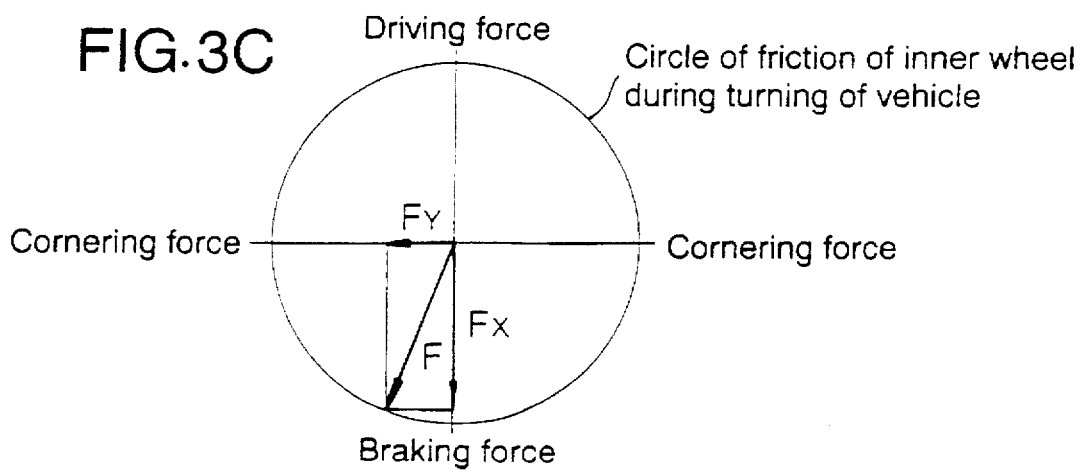

FIGS. 3A, 3B and 3C show circles of friction of the tire of an inner wheel during turning movement of the vehicle in correspondence to the lateral acceleration $Y_1$, $Y_2$ and $Y_3$, respectively, shown in FIG. 2. As the lateral acceleration value is increased in a manner of $Y_1 \rightarrow Y_2 \rightarrow Y_3$, the radius F of the circle of friction of the tire of the inner wheel (i.e., a largest frictional force between the tire and the road surface) is decreased. When the lateral acceleration value is a relatively small value $Y_1$, the largest frictional force F is large and the torque transfer capacity $F_x$ is small, as shown in FIG. 3A and hence, a sufficiently large cornering force $F_Y$ is insured.

When the lateral acceleration value is increased from $Y_1$ to $Y_2$, the largest frictional force F is decreased, while the torque transfer capacity $F_X$ reaches a largest value when lateral acceleration is at $Y_2$ corresponding to the Q point in FIG. 2. However, the torque transfer capacity $F_x$ is smaller than the largest frictional force F, as shown in FIG. 3B and hence, a required cornering force $F_Y$ is still insured. When the lateral acceleration value is further increased from $Y_2$ to $Y_3$, the largest frictional force F is further decreased, but the torque transfer capacity $F_X$ is also decreased. Therefore, the torque transfer capacity $F_X$ is maintained smaller than the largest frictional force F, as shown in FIG. 3C and as a result, the required cornering force $F_Y$ is still insured.

In FIG. 2, the largest frictional force F is represented by an algebraic sum of the torque transfer capacity $F_X$ and the cornering force $F_Y$, but an actual largest frictional force F is a vector sum of the torque transfer capacity $F_X$ and the cornering force $F_Y$.

During high-speed traveling of the vehicle, a driving force is applied to the inner one of the left and right rear wheels $W_{RL}$ and $W_{RR}$ and a braking force is applied to the outer one of the left and right rear wheels $W_{RL}$ and $W_{RR}$ during turning movement of the vehicle in order to enhance the high speed stability performance. In the case of high-speed traveling, if the driving force $F_X$ of the inner wheel during turning of the vehicle is simply increased in accordance with an increase in lateral acceleration, the driving force $F_X$ of the inner wheel soon exceeds the radius F of the circle of friction of the tire of the inner wheel (i.e., the largest frictional force F between the tire and the road surface) and thus, the required cornering force $F_Y$ cannot be insured, as during the above-described lower—or medium—speed traveling of the vehicle. Even during this high-speed traveling of the vehicle, however, the present invention insures the required cornering force $F_Y$ by maintaining the torque transfer capacity $F_X$ smaller than the largest frictional force, as shown by the solid line in FIG. 2.

As described above, the torque transfer capacity $F_X$ of the first and second hydraulic clutches $3_L$ and $3_R$ is controlled such that it is decreased in the higher lateral acceleration range and, therefore, the torque transfer capacity $F_X$ is prevented from exceeding the largest frictional force of the tire. Thus, the required cornering force $F_Y$ can be always insured by the present invention. Moreover, in the lower lateral acceleration range free of a possibility that the cornering force $F_Y$ is insufficient, the torque transfer capacity $F_X$ of the first and second hydraulic clutches $3_L$ and $3_R$ is increased in accordance with an increase in lateral acceleration and, therefore, the turning performance and the high-speed stability performance can be insured.

Although the preferred embodiment of the present invention has been described in detail, it will be understood that the present invention is not limited to the above-described embodiment, and that various modifications in design may be made without departing from the spirit and scope of the invention defined in claims.

For example, although the distribution of the torque between the left and right rear wheels $W_{RL}$ and $W_{RR}$ as follower wheels has been described in the embodiment, the present invention is applicable to the distribution of a torque between left and right front wheels $W_{FL}$ and $W_{FR}$ which are follower wheels in a rear wheel drive vehicle. The present invention is also applicable to the distribution of a torque between follower wheels in a vehicle in which an auxiliary drive source such as an electric motor is connected to the follower wheels, such that the auxiliary drive source is not driven in a constant fashion, but during slipping of driven wheels to provide a four-wheel drive state. In other words, the present invention is applicable to the distribution of a torque between non-main driven wheels defined by follower wheels having no drive source and follower wheels having an auxiliary drive source.

Further, although the torque transfer capacity $F_X$ is decreased such that it does not exceed the largest frictional force of the tire in the higher lateral acceleration range in the preferred embodiment, if the torque transfer capacity $F_X$ is controlled such that it is decreased in accordance with an increase in lateral acceleration in the higher lateral acceleration range irrespective of the magnitude relationship with the largest frictional force of the tire, a sufficient effect can be provided.

Yet further, another clutch such as an electromagnetic clutch and a fluid clutch can be used in place of the first and second hydraulic clutches $3_L$ and $3_R$, while a different indication of the vehicle's lateral dynamic condition, such as yaw rate, could be used in place of vehicle lateral acceleration in the invention.

What is claimed is:

1. A torque distribution control system in a vehicle, comprising a gearbox and a torque transmitting clutch which connect left and right wheels of the vehicle which do not receive a driving force from a drive source in a constant fashion, to each other to generate a braking force to one of the left and right wheels and to generate a driving force to the other of the left and right wheels;

control means for controlling a torque transfer capacity of said torque transmitting clutch based on at least a lateral dynamic condition of the vehicle; and said control means increases said torque transfer capacity in accordance with an increase in said lateral dynamic condition, when the lateral dynamic condition is lower than a predetermined value, and said control means decreases said torque transfer capacity in accordance with an increase in said lateral dynamic condition, when the lateral dynamic condition is equal to or higher than said predetermined value.

2. A torque distribution control system according to claim 1, wherein said lateral dynamic condition of the vehicle is lateral acceleration.

3. A torque distribution control system according to claim 1, wherein said lateral dynamic condition of the vehicle is yaw rate.

4. A torque distribution control system according to claim 1, wherein said control means controls the torque transfer capacity of said torque transmitting clutch additionally based on a longitudinal dynamic condition of the vehicle.

5. A torque distribution control system according to claim 4, wherein said longitudinal dynamic condition of the vehicle is longitudinal acceleration.

6. A torque distribution control system according to claim 1, wherein said control means controls the torque transfer capacity such that it is always less than a largest frictional force of an inner one of said left and right wheels during turning movement of the vehicle.

7. A torque distribution control system according to claim 1, wherein said control means controls said torque transfer capacity such that it linearly increases in accordance with the increase in said lateral dynamic condition lower than said predetermined value, and linearly decreases in accordance with the increase in lateral dynamic condition equal to or higher than said predetermined value.

8. A torque distribution control system according to claim 7, wherein said control means control said torque transfer capacity so as to linearly decrease at a rate substantially equal to a rate of decrease of a largest frictional force of an inner one of said left and right driven wheels during turning movement.

9. A torque distribution control system according to claim 1, wherein said control means controls said torque transfer capacity by continuously controlling an engagement force of the clutch.

10. A torque distribution control system according to claim 1, wherein said control means controls the torque transfer capacity by continuously varying a ratio of rotational speeds between said left and right wheels within a range set by said gearbox and based on at least said lateral dynamic condition.

11. A torque distribution control system according to claim 1, including means for detecting said lateral dynamic condition of the vehicle, means for detecting a steering angle of the vehicle and means for detecting rotational speeds of said left and right wheels; and said control means modifies said detected lateral dynamic condition based on said detected steering angle and said detected wheel speeds to offset a time lag of said detected lateral dynamic condition.

12. A torque distribution control system according to claim 1, wherein said left and right wheels are not connected to a drive source.

13. A torque distribution control system in a vehicle, comprising:

a gearbox and a torque transmitting clutch which connect left and right wheels of the vehicle which do not receive a driving force from a drive source in a constant fashion, to each other to generate a braking force to one of the left and right wheels and to generate a driving force to the other of the left and right wheels;

control means for controlling a torque transfer capacity of said torque transmitting clutch based on at least a lateral dynamic condition of the vehicle; and said control means increases said torque transfer capacity in accordance with an increase in said lateral dynamic condition when the lateral dynamic condition is in a low range, and said control means maintains the torque transfer capacity at a value less than the largest friction force of an inner one of said left and right wheels during turning movement.

14. A torque distribution control system according to claim 13, wherein said control means decreases said torque transfer capacity in accordance with an increase in said lateral dynamic condition in a high lateral acceleration range.

15. A torque distribution control system according to claim 13, wherein said left and right wheels are not connected to a drive source.

16. A torque distribution control system on a vehicle, comprising a gear box and a torque transmitting clutch which connect left and right non-driven wheels of the vehicle to each other to generate a braking force to one of the left and right non-driven wheels and to generate a driving force to the other of the left and right non-driven wheels;

control means for controlling a torque transfer capacity of said torque transmitting clutch based on at least a lateral dynamic condition of the vehicle; and said control means increases said torque transfer capacity in accordance with an increase in said lateral dynamic condition, when the lateral dynamic condition is lower than a predetermined value, and said control means decreases said torque transfer capacity in accordance with an increase in said lateral dynamic condition when the lateral dynamic condition is equal to or higher than said predetermined value.

\* \* \* \* \*

UNITED STATES PATENT AND TRADEMARK OFFICE
CERTIFICATE OF CORRECTION

PATENT NO. : 5,752,575
DATED : 19 May 1998
INVENTOR(S) : Yoshikazu Kohishi, Tetsurou Hamada, Yoshihiro Kanamaru It is certified that error appears in the above-identified patent and that said Letters Patent is hereby corrected as shown below:

Column 2, line 48, change "an" to --and--.

Column 5, 16th line, change "$WR_L$" to --$W_{RL}$--.

Column 6, 47th line, change "lower-or medium-speed" to --lower-or medium-speed--.

Column 8, 17th line, delete "driven".

Signed and Sealed this

First Day of September, 1998

BRUCE LEHMAN

*Attest:*

*Attesting Officer*     *Commissioner of Patents and Trademarks*